(12) United States Patent
Maheshwari et al.

(10) Patent No.: US 10,003,075 B2
(45) Date of Patent: Jun. 19, 2018

(54) CARBON NANOTUBE-METAL NANOCOMPOSITES AS FLEXIBLE, FREE STANDING, BINDER FREE HIGH PERFORMANCE ANODE FOR LI-ION BATTERY

(71) Applicant: Council of Scientific and Industrial Research, New Delhi (IN)

(72) Inventors: Heda Priyanka Maheshwari, New Delhi (IN); Indu Elizabeth, New Delhi (IN); Bhanu Pratap Singh, New Delhi (IN); Chanchal Gupta, New Delhi (IN); Rakesh Behari Mathur, New Delhi (IN); Gopukumar Sukumaran, Tamil Nadu (IN)

(73) Assignee: Council of Scientific and Industrial Research, New Delhi (IN)

( * ) Notice: Subject to any disclaimer, the term of this patent is extended or adjusted under 35 U.S.C. 154(b) by 163 days.

(21) Appl. No.: 14/736,796

(22) Filed: Jun. 11, 2015

(65) Prior Publication Data
US 2015/0364750 A1    Dec. 17, 2015

(30) Foreign Application Priority Data
Jun. 12, 2014   (IN) .......................... 1592/DEL/2014

(51) Int. Cl.
| | | |
|---|---|---|
| *H01M 4/133* | (2010.01) | |
| *H01M 4/587* | (2010.01) | |
| *H01M 4/13* | (2010.01) | |
| *H01M 4/139* | (2010.01) | |
| *H01M 4/36* | (2006.01) | |
| *H01M 4/48* | (2010.01) | |
| *H01M 4/02* | (2006.01) | |

(52) U.S. Cl.
CPC ............ *H01M 4/587* (2013.01); *H01M 4/13* (2013.01); *H01M 4/139* (2013.01); *H01M 4/362* (2013.01); *H01M 4/483* (2013.01); *H01M 4/133* (2013.01); *H01M 2004/027* (2013.01)

(58) Field of Classification Search
None
See application file for complete search history.

(56) References Cited

U.S. PATENT DOCUMENTS

| | | | |
|---|---|---|---|
| 6,746,801 B2 | 6/2004 | Tamura et al. | |
| 7,094,499 B1 | 8/2006 | Hung | |
| 2010/0055568 A1* | 3/2010 | Kim ...................... | B82Y 30/00 429/231.1 |
| 2011/0045347 A1* | 2/2011 | Liu ....................... | H01M 4/366 429/209 |
| 2011/0070495 A1 | 3/2011 | Ban et al. | |
| 2011/0297889 A1 | 12/2011 | Plee et al. | |
| 2012/0135307 A1 | 5/2012 | Son et al. | |
| 2013/0323624 A1* | 12/2013 | Wang .................... | H01M 4/926 429/524 |
| 2014/0050973 A1* | 2/2014 | Manthiram ......... | H01M 2/1646 429/188 |

OTHER PUBLICATIONS

Noerochim et al. Free-standing single-walled carbon nanotube/SnO2 anode paper for flexible lithium ion batteries. Carbon, 50(3), 1289-1297 (Year: 2012).*
Guler et al. High efficiency TiO2/MWCNT based anode electrodes for Li-ion batteries. Int J Energy Res. 2015; 39: 172-180 (Year: 2015).*
Idota, Y., et al., "Tin-Based Amorphous Oxide: A High-Capacity Lithium-Ion-Storage Material", *Science*, 276(5317), (1997), 1395-1397.

* cited by examiner

*Primary Examiner* — Tanisha Diggs
(74) *Attorney, Agent, or Firm* — Schwegman Lundberg & Woessner, P.A.

(57) ABSTRACT

The present invention relates to carbon nanotubes-metal nano composite by chemical route and the corresponding development of strong and flexible, light weight, self-supporting anode through simple vacuum filtration technique, which is favored by the high aspect ratio of the Multi-walled carbon nanotubes. The self-supported anode has an added advantage that it can be used as electrodes without binder and electrical conductor (unlike other carbonaceous powder materials) that helps us to elucidate the precise electrochemical properties. The metals used can be Sn, Si, Al, etc. The developed high capacity, free-standing anode can be used in rechargeable Li-ion batteries and is demonstrated successfully in powering solar lantern.

3 Claims, 3 Drawing Sheets

CARBON NANOTUBE-METAL NANOCOMPOSITES AS FLEXIBLE, FREE STANDING, BINDER FREE HIGH PERFORMANCE ANODE FOR LI-ION BATTERY

CLAIM OF PRIORITY

This application claims the benefit of priority of India Patent Application No. 1592/DEL/2014, entitled "CARBON NANOTUBE-METAL NANOCOMPOSITES AS FLEXIBLE, FREE STANDING, BINDER FREE HIGH PERFORMANCE ANODE FOR LI-ION BATTERY," filed on Jun. 12, 2014, the benefit of priority of which is claimed hereby, and which is incorporated by reference herein in its entirety.

FIELD OF THE INVENTION

The present invention relates to the development of carbon nanotubes-metal nano composite by chemical route and the corresponding development of strong and flexible, light weight, self-supporting anode through simple vacuum filtration technique, which is favored by the high aspect ratio of the Multi-walled carbon nanotubes. The self-supported anode has an added advantage that it can be used as electrodes without binder and electrical conductor (unlike other carbonaceous powder materials) that helps us to elucidate the precise electrochemical properties. The metals used can be Sn, Si, Al etc. The developed high capacity, free-standing anode can be used in rechargeable Li-ion batteries and is demonstrated successfully in powering solar lantern.

BACKGROUND OF THE INVENTION

As a stepping stone towards the energy efficient green living, investments for the exploitation of renewable energy resources are increasing worldwide, with particular attention to wind and solar power energy plants. But, the intermittence of these resources requires high efficiency energy storage systems. Today the most convenient form of power source are the electrochemical cells/batteries that provide portability for chemical energy storage and its conversion to electrical energy by electrochemical oxidation and reduction reactions which occur at the electrodes. Additional benefits appear in the form of zero emissions and high energy conversion efficiency.

In addition, there is currently an enormous research effort aimed at developing ultrathin, flexible and soft batteries to cater for the bendable modern gadgets. The goal is improved rate capability without a penalty in charge capacity, and sufficient electrochemical cycling characteristics. Flexible batteries are not only needed, e.g., for rolled-up displays, active radio-frequency identification tags, integrated circuit smart cards and implantable medical devices, but there is also the intention to place large flexible batteries in hollow spaces of the auto body of future hybrid and electric vehicles. Needless to stress that high power and high energy density are expected. Of course, the battery performance is closely related to the structural and electrochemical properties of the applied electrodes. Hence, the development of flexible electrodes with high energy and power density, good rate capability which can function safely for many years becomes important.

Li-ion batteries (LIB) are preferred over other systems because of long cycle life, broad temperature range of operation, low self discharge rate, high performance in terms of capacity and energy density and no memory effect. They are also referred to as rocking chair batteries as the lithium ions "rock" back and forth between the positive and negative electrodes as the cell is charged and discharged. Of the components, anode is one of the most critical parts in the proper functioning of the cells since it acts as a host for the Li ions. Not only, it should have a high Li insertion capacity, but also allow the insertion/de-insertion of Li with ease while retaining its structural stability for high cyclability and longer cell life.

Carbon is so far the most preferred material for LIB anode but its storage density, often called capacity, has a theoretical limit (in the case of graphite it is 372 mAhg$^{-1}$). Different metals like Sn, Al, Si etc. have therefore been investigated that are capable of storing far more lithium per gram by alloying with the later. These are however intrinsically unstable during cycling due to pulverization that causes large volume expansions (>250%) thus affecting the structural integrity of the anode. Moreover, the anode materials that are prepared in the powder form are usually coated onto a copper current collector to make them conductive and mechanically robust. This limits the flexibility of the electrode and also adds to the dead weight of the cell.

It is postulated that nano-structured electrodes can display better cycle stability. The advantage of small particles can be explained by the low volume expansion and suppression of cracking and pulverization. Furthermore, small particle has fast electrode kinetics due to increased surface area. It should be noted that higher surface area will consume more Li for solid electrolyte interface (SEI) formation causing higher electrochemical irreversibility in the initial cycles. A more improved way to solve this problem is to use a second phase in order to accommodate the large volume change that occurs during charge/discharge cycles. Excellent conducting capabilities and small volume expansion for Li insertion make carbon an ideal matrix for lithium storage metals. It is expected that metallic nanoparticles uniformly dispersed and fixed on carbon can suppress their aggregation. Carbon coating can also restrain the electrolyte decomposition and provide integral and continuous conducting networks around the metal particles.

Among various kinds of carbon materials, the carbon nanotubes are attractive due to their unique structure, high electrical conductivity, high aspect ratio(>1000), remarkable thermal conductivity, good capacity and good mechanical properties. The advantages of this type of carbon nanotubes/metal composite are the increased capacity of the metal alloying materials while using the carbon nanotubes as a scaffold to prevent pulverization and crumbling in the anode. A compound made of both metal and carbon nanotubes has two mechanisms to store lithium with, intercalation and alloying. In addition to increased capacity and better cycling, carbon nanotubes can act as a conductive wire to transport electrons. Moreover, the high tensile strength, high flexibility and high aspect ratio (>1000) of carbon nanotubes make them uniquely suited for making free standing, flexible anode material for lithium ion cell.

PRIOR ART AND THEIR DRAWBACKS

U.S. Publication No. 2011/0070495 A1 provides a method of fabricating a high capacity, binder free anode for Lithium ion batteries using hydrothermal process and vacuum filtration process. The electrode includes an active portion that is made up of electrochemically active nanoparticles, with one embodiment utilizing 3d-transition metal oxides to provide the electrochemical capacity of the electrode. The active material includes other electrochemical materials such as Si, Sn, etc. The electrode also includes a matrix or a net of electrically conductive nanomaterial like carbon nanotubes that acts to connect or bind the active material such that no binder is required for the electrode. But the anode material prepared is not free standing and requires a Cu current collector.

U.S. Publication No. 2011/0297889 A1 discloses a method for manufacturing a composite material including tin oxide particles and a fibrillar carbon material, including synthesizing tin hydroxide particles obtained from a tin salt by precipitation/nucleation in a water-alcohol medium, in the presence of the fibrillar carbon material like carbon nanotubes or carbon nanofibers or a mixture of the two, and an acid. The anode material prepared was mixed with a binder and electronic conductor and then coated onto a metallic current collector and used as anode.

U.S. Pat. No. 7,094,499 B1 directs to a method of making a composite material for use as anode for a lithium ion battery. The process includes selecting a carbon material as a constituent part of the composite, chemically treating the selected carbon material to receive nanoparticles, incorporating nanoparticles into the chemically treated carbon materials and removing surface nanoparticles from an outside surface of the carbon material with incorporated nanoparticles. The invention also directs to a material making up the nanoparticles alloys with lithium like palladium, tin or tin oxide.

LIMITATIONS

In all the patents, the conventional methods for the fabrication of LIB electrodes which usually involves mixing, casting, and pressing the mixed constituents, including an anode material for lithium storage, a binder, such as polyvinylidene fluoride, to inhibit the collapse of the active materials from metal current collectors, and an electrical conductor to maintain the electrode conductivity onto the metal current collectors is used.

It is worth noting that the binders and the metal current collectors make no contribution to lithium storage, and the electrical conductor exhibits minimal lithium storage performance; thus, these components significantly decrease the energy density of LIBs. Moreover, the presence of binders in the electrodes decreases the accessible specific area of the active materials and increases the electrochemical polarization of the electrodes, undermining effective lithium ion transport. It also limits the working temperature range due to the thermal instability of the binder. The binder, electric conductor and the metal collectors together constitutes more than 20% of the total weight of the high power cells which is a dead weight with no contribution to the cell capacity.

The optimization of the amount of binder to be added is very important. Each new material should be optimized separately. The optimization parameters depend on the particle size, agglomeration, surface properties etc.

Also the electrodes are based on metal current collectors, which are not flexible because the active material layers are easily cracked or peeled off when metal current collectors are bent.

There are also other problems related to metallic current collectors (Cu in the case of anode) like optimization of the surface polishing of the Cu for proper adhesion of the anode material, corrosion of the metal current collector when in contact with the electrolyte, increasing dead weight and also increased cost etc. Therefore, the development of a flexible, lightweight, binder-free and current collector-free electrode configuration to increase the energy density is important.

OBJECTIVES OF THE INVENTION

The main objective of the present invention is the preparation of a flexible, free standing, binder free, high capacity anode for Lithium ion battery. Another objective of the present invention is to provide a method for the preparation of the anode.

Another objective of the present invention is to provide a fast and easy process for the development carbon nanotubes metal nano composites.

Yet another objective of the present invention is to develop a carbon nanotubes-metal nano composite which has a high capacity and flexibility, enabling its use as free standing anode material for Li-ion Battery which can be used in Renewable energy storage systems.

SUMMARY OF THE INVENTION

Accordingly, the present invention provides an anode comprising of Carbon Nano Tubes (CNT) and metal nanocomposite with high reversible capacity and excellent cyclability. The anode developed is binder less, highly flexible and free standing, i.e. it can be used as anode for Li ion battery without the need of an electric conductor and Cu current collector.

In another embodiment of the present invention, the process for the preparation of carbon nanotubes-metal nanocomposite as anode material comprising the steps of:
i. dispersing multiwalled carbon nanotubes in ethylene glycol for 2-4 hours;
ii. dissolving metal salts in distilled water to get 0.01-0.05 M solution;
iii. addition of metal salt solution to the dispersed carbon nanotubes gradually with constant stirring;
iv. refluxing the suspension obtained above in air at 100° C. for 4-8 hours;
v. filtering and washing the filtrate obtained using distilled water;
vi. drying the filtrate to get Multiwalled carbon nanotubes/Tin (II) oxide nanocomposites;
vii. disperse the Multiwalled carbon nanotubes/Tin (II) oxide nanocompsite in different solvents like iso propyl alcohol, acetone etc. using ultra sonication;
viii. obtaining a free standing anode using paper making technology;

In yet another embodiment of the present invention, the solvent is selected from the group consisting of polyols.

In yet another embodiment of the present invention, carbon nanotubes are selected from multi-walled carbon nanotubes (MWCNT), single-walled carbon nanotubes (SWCNTs) or combination thereof.

In yet another embodiment of the present invention, carbon nanotubes are produced via CVD (Chemical Vapor Deposition), arc discharged or HiPCo (High Pressure Carbon Monoxide).

In yet another embodiment of the present invention, carbon nanotubes obtained in step (ii) and step (iii) is in the form of a free standing paper.

In yet another embodiment of the present invention, free standing material is obtained by paper making technology through vacuum filtration.

In yet another embodiment of the present invention, filtration unit comprises, top coupler, filter paper, metallic sieve, bottom coupler, rubber cork, vacuum port and conical vacuum flask In yet another embodiment of the present invention discloses a flexible, free standing anode material in the form of paper for Li-ion Battery comprising Carbon Nano Tubes (CNT) and metal in the ratio ranging between 100:0 to 50:50 was tested in a coin cell which gave specific capacity in the range of 136 to 417 mAh/g after 50 cycles at C/10 rate.

In another embodiment of the present invention, the process for the preparation of flexible, free standing, anode material in the form of paper, wherein said process comprising the steps of:
i. dispersing carbon nanotubes in polyols like ethylene glycol, polyethylene glycol by using ultrasonication for 3 hours;
ii. dissolving inorganic metallic salts like Tin (II) chloride (30 wt %) in distilled water by ultrasonication;
iii. mixing the solution obtained from step (i) and (ii) using magnetic stirrer for 1 hour;
iv. refluxing of the solution obtained from step (iii) in air at 100° C. for 4 hours;
v. filtering of solution obtained from step (iv) in a vacuum filtration unit to obtain the metal oxide/carbon nanotube nanocomposite;
vi. washing of filtrate obtained in step (v) using Deionized water;
vii. drying of composite obtained from step (vi) in vacuum oven; and
viii. obtaining the flexible, free standing, anode material in the form of paper through paper making technology using vacuum filtration.

In yet another embodiment of the present invention, the solvent is selected from the group consisting of derivatives of ethylene glycol and other polyols like diethylene glycol, polyethylene glycol, etc.

The carbon nanotubes of the present invention are selected from the group consisting of multi-walled carbon nanotubes (MWCNT), single-walled carbon nanotubes (SWCNTs) carbon nanofiber, carbon fiber and combination thereof.

In yet another embodiment of the present invention, the free standing anode can be used without any binder, electrical conductor and current collector.

BRIEF DESCRIPTION OF DRAWINGS & FIGURES

FIG. 1 explains the electrochemical performance of the battery.

DETAILED DESCRIPTION OF THE INVENTION

Present invention provides a flexible, free standing, binder free carbon-metal nanocomposite anode and a process for making the same. The flexibility of the bucky paper enables its use in different shapes according to the applications.

Multiwalled carbon nanotubes (MWCNTs) with diameter 2-100 nm and aspect ratio>100 were uniformly dispersed in polyols by ultra sonication. Polyols not only act as a good dispersing agent for the carbon nanotubes but also as a spacer to modulate the distance between metal ions, preventing metal oxide particles from aggregation during earlier stages of organics removal. Solution of metal salts like Tin(II) salts in distilled water was added to the above suspension gradually with constant stirring. The above suspension is refluxed in air between 130-100° C. for 4-8 hours. The process of refluxing immobilizes tin in the form of tin (II) oxide on the carbon nanotubes thus forming carbon nanotubes/Tin(II) oxide nano composite. Although polyol acts as a reducing agent, Tin nano particles on the surface of carbon nanotubes quickly oxidize to Tin(II) oxide nano particles due to the oxygen atmosphere in the solution. Refluxing was followed by washing with sufficient amounts of de-ionized water and drying, thus producing the Tin(II) oxide/multiwalled carbon nanotubes nano composites.

Free standing anodes were made from the nanocomposites by paper making technology. The setup consists of a vacuum pump attached with a filtration unit. Here, we have introduced a very simple vacuum filtration technique for fabricating the anode. Tin(II) oxide/multiwalled carbon nanotubes nano composites were dispersed in different solvents like isopropyl alcohol, acetone, etc. by ultra-sonication. The well dispersed tubes were vacuum filtered to give Tin(II) oxide/multiwalled carbon nanotubes paper. The paper (free standing anodes) so formed was found to be mechanically robust and flexible.

Figure 1:
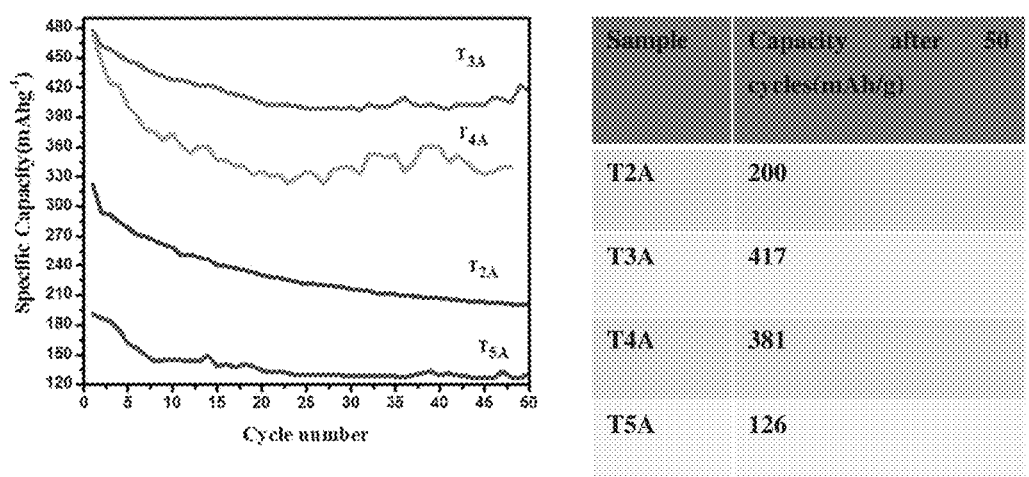
Figure 2:
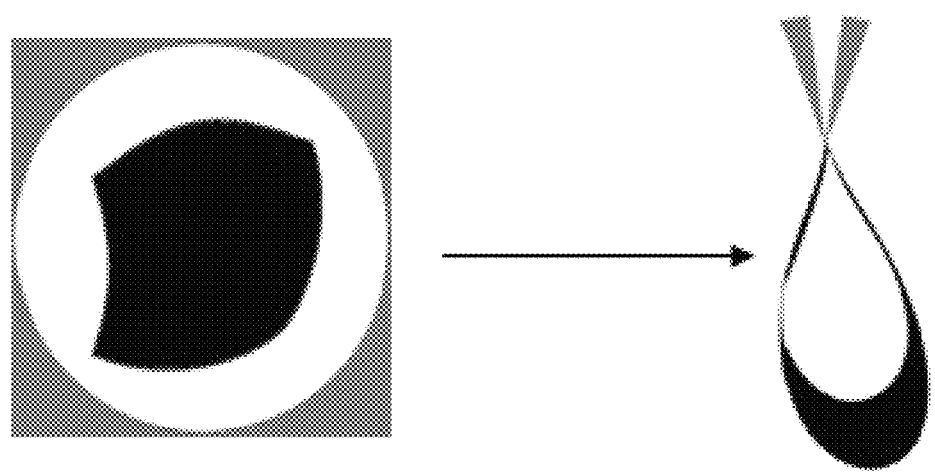
FIG. 2 shows free standing flexible anode for Li ion rechargeable batteries.
Figure 3:
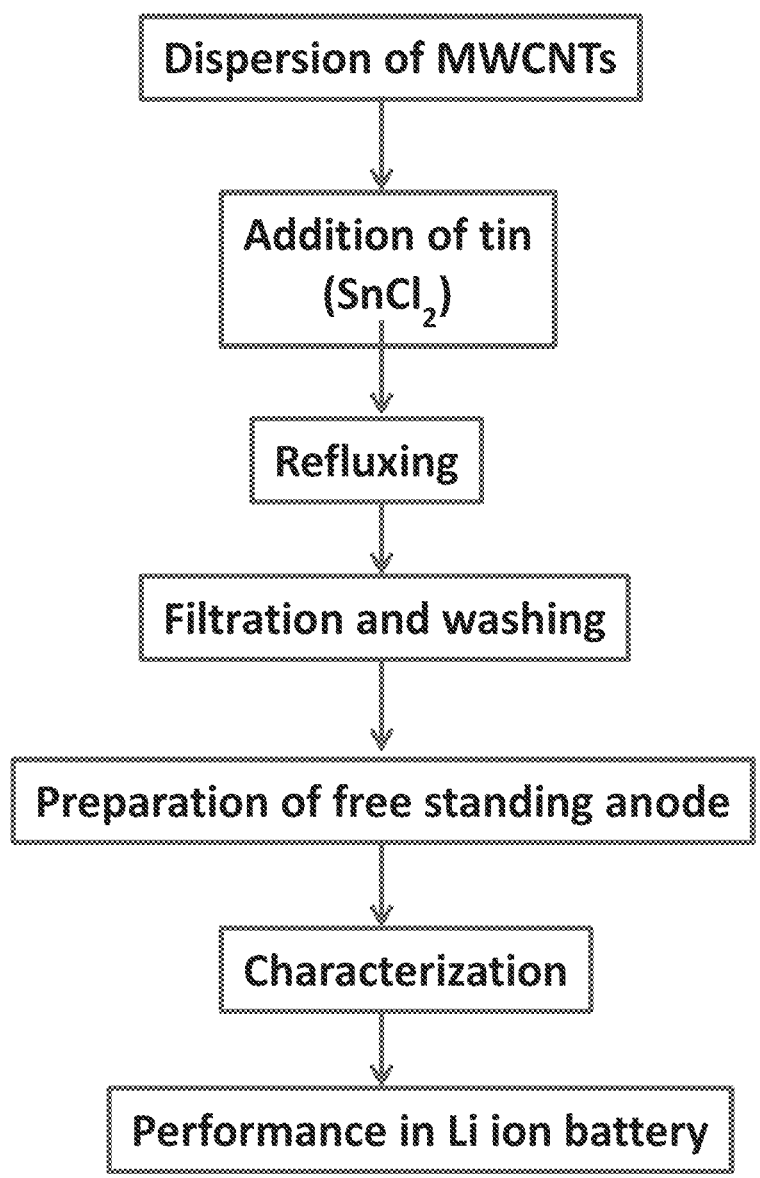
FIG. 3 shows a flowchart of the process involved in the synthesis of the anode material.

A flowchart of the process involved in the synthesis of the anode material is illustrated in FIG. 3.

EXAMPLES

The following examples are given by way of illustration of the present invention and therefore should not be construed to limit the scope of the present invention.

Example 1

0.1 g of MWCNT was dispersed in 150 ml ethylene glycol by ultra sonication. The sample was refluxed in air for 4 hours at 100° C. Refluxing was followed by washing with sufficient amounts of de-ionized water and drying. 0.1 g of the nanocomposites was dispersed in 100 ml of isopropyl alcohol by ultra sonication. The well dispersed tubes were vacuum filtered using filtration setup to obtain MWCNT paper which can be used as flexible, freestanding anode in Lithium ion batteries.

The free standing samples prepared as anode (with diameter 18 mm) were dried in vacuum oven and transferred into the gloves box and placed into the half cell consisting of lithium foil as a counter electrode, a separator (polypropylene film) and organic electrolyte (1M $LiPF_6$ in 1:1 ratio of EC+DEC). The cell was allowed to age for 24 hours. Galvanostatic charge—discharge was carried out at C/10 rate. The sample gave a discharge capacity of 136 mAh/g after 50 cycles.

Example 2

0.3 g of multiwalled carbon nanotubes (MWCNTs) was dispersed in 150 ml ethylene glycol by ultra sonication. 0.01 M solution of $SnCl_2$ in distilled water was added to the above suspension drop by drop with constant stirring such that the ratio of Sn:CNT was 1:4 (i.e. 20 wt % Sn: 80 wt % MWCNT). The pH of the above solution was measured and was found to be less than 2. The sample was refluxed in air for 4 hours at 100° C. Refluxing was followed by washing with sufficient amounts of de-ionized water and drying, thus producing the Tin(II) oxide/multiwalled carbon nanotubes nano composites.

0.1 g of the nanocomposites was dispersed in 100 ml of iso propyl alcohol by ultra sonication. The well dispersed tubes were vacuum filtered using filtration setup to obtain Tin(II) oxide/multiwalled carbon nanotubes paper which can be used as flexible, freestanding anode in Lithium ion batteries.

The sample gave a discharge capacity of 200 mAh/g after 50 cycles when used as anode in Li ion battery.

Examples 3

0.3 g of multiwalled carbon nanotubes (MWCNTs) was dispersed in 150 ml ethylene glycol by ultra sonication. 0.01 M solution of $SnCl_2$ in distilled water was added to the above suspension drop by drop with constant stirring such that the ratio of Sn:CNT was 1:4 (i.e. 20 wt % Sn: 80 wt % MWCNT). The pH of the above solution was measured and was found to be less than 2. The sample was refluxed in nitrogen for 4 hours at 100° C. Refluxing was followed by washing with sufficient amounts of de-ionized water and drying, thus producing the Tin(II) oxide/multiwalled carbon nanotubes nano composites.

0.1 g of the nanocomposites was dispersed in 100 ml of iso propyl alcohol by ultra sonication. The well dispersed tubes were vacuum filtered using filtration setup to obtain Tin (II) oxide/multiwalled carbon nanotubes paper which can be used as flexible, freestanding anode in Lithium ion batteries. The sample showed a capacity of 175 mAh/g after 30 cycles.

Example 4

0.3 g of multiwalled carbon nanotubes(MWCNT) was dispersed in 150 ml ethylene glycol by ultra sonication. 0.01 M solution of $SnCl_2$ in distilled water was added to the above suspension drop by drop with constant stirring such that the ratio of Sn:CNT was 1:4 (i.e. 30 wt % Sn: 70 wt % MWCNT). The pH of the above solution was measured and was found to be less than 2. The sample was refluxed in air for 4 hours at 100° C. Refluxing was followed by washing with sufficient amounts of de-ionized water and drying, thus producing the Tin(II) oxide/multiwalled carbon nanotubes nano composites.

0.1 g of the nanocomposites was dispersed in 100 ml of isopropyl alcohol by ultra sonication. The well dispersed tubes were vacuum filtered using filtration setup to obtain Tin (II) oxide/multiwalled carbon nanotubes paper which can be used as flexible, freestanding anode in Lithium ion batteries. The specific capacity of the sample is 417 mAh/g after 50 cycles.

Example 5

0.3 g of multiwalled carbon nanotubes (MWCNT) was dispersed in 150 ml ethylene glycol by ultra sonication. 0.01 M solution of $SnCl_2$ in distilled water was added to the above suspension drop by drop with constant stirring such that the ratio of Sn:CNT was 1:4 (i.e. 40 wt % Sn: 60 wt % MWCNT). The pH of the above solution was measured and was found to be less than 2. The sample was refluxed in air for 4 hours at 100° C. Refluxing was followed by washing with sufficient amounts of de-ionized water and drying, thus producing the Tin(II) oxide/multiwalled carbon nanotubes nano composites.

0.1 g of the nanocomposites was dispersed in 100 ml of isopropyl alcohol by ultra sonication. The well dispersed tubes were vacuum filtered using filtration setup to obtain Tin (II) oxide/multiwalled carbon nanotubes paper which can be used as flexible, freestanding anode in Lithium ion batteries.

The specific capacity of the sample is 380 mAh/g after 50 cycles.

Table 1 gives the summary of the various samples made and their cycling performances. The sample naming is as follows:

$T_0$—Pristine Multiwalled carbon nanotube,
$T_{2A}$—anode sample prepared in by air refluxing in acidic medium with 20 wt % Tin loading,
$T_{2N}$—anode sample prepared in by air refluxing in neutral medium with 20 wt % Tin loading, $T_{2B}$—anode sample prepared in by air refluxing in basic medium with 20 wt % Tin loading,
$T_{3A}$—anode sample prepared in by air refluxing in acidic medium with 30 wt % Tin loading,
$T_{4A}$—anode sample prepared in by air refluxing in acidic medium with 40 wt % Tin loading,
$T_{5A}$—anode sample prepared in by air refluxing in acidic medium with 50 wt % Tin loading,
$N_{2A}$—anode sample prepared in by nitrogen refluxing in acidic medium with 20 wt % Tin loading,
$N_{2N}$—anode sample prepared in by nitrogen refluxing in neutral medium with 20 wt % Tin loading,
$N_{2B}$—anode sample prepared in by nitrogen refluxing in basic medium with 20 wt % Tin loading,

TABLE 1

| | Charge discharge cycles for Li-ion Battery with Multiwalled carbon nanotubes-$SnO_2$ electrode | | | | | | | | | |
|---|---|---|---|---|---|---|---|---|---|---|
| PARAMETER | $T_0$ | $T_{2A}$ | $T_{2N}$ | $T_{2B}$ | $T_{3A}$ | $T_{4A}$ | $T_{5A}$ | $N_{2A}$ | $N_{2N}$ | $N_{2B}$ |
| $1^{st}$ charge capacity(mAh/g) | 1740 | 1635 | 1599 | 1556 | 709 | 2516 | 1247 | 1371 | 1347 | 926 |
| $1^{st}$ discharge capacity(mAh/g) | 153 | 322 | 306 | 204 | 478 | 475 | 191 | 239 | 229 | 208 |
| $1^{st}$ cycle irreversibility(mAh/g) | 1587 | 1313 | 1293 | 1352 | 231 | 2041 | 1056 | 1132 | 1118 | 718 |
| $2^{nd}$ charge capacity(mAh/g) | 212 | 375 | 348 | 275 | 543 | 574 | 248 | 328 | 301 | 260 |
| $2^{nd}$ discharge capacity(mAh/g) | 144 | 294 | 306 | 187 | 462 | 447 | 187 | 223 | 214 | 195 |
| $30^{th}$ cycle discharge capacity(mAh/g) | 137 | 217 | 209 | 154 | 399 | 323 | 128 | 175 | 148 | 134 |
| Capacity retention after 30 cycles(%) | 95 | 73 | 68 | 82 | 86 | 72 | 68 | 78 | 69 | 68 |

TABLE 1-continued

Charge discharge cycles for Li-ion Battery with
Multiwalled carbon nanotubes-SnO$_2$ electrode

| PARAMETER | $T_0$ | $T_{2A}$ | $T_{2N}$ | $T_{2B}$ | $T_{3A}$ | $T_{4A}$ | $T_{5A}$ | $N_{2A}$ | $N_{2N}$ | $N_{2B}$ |
|---|---|---|---|---|---|---|---|---|---|---|
| Discharge capacity after 50 cycles(mAh/g) | 136 | 200 | 193 | 150 | 417 | 381 | 126 | — | — | — |
| Capacity retention after 50 cycles (%) | 94 | 68 | 63 | 80 | 90 | 85 | 67 | — | — | — |

ADVANTAGES OF THE INVENTION

1) The process of synthesizing the flexible free-standing anode for Li ion battery is novel and is simple
2) The free standing anode which has been developed has many advantages as follows:
   a) With the removal of the binders and current collector, the dead weight of an electrode is decreased, leading to the increase of usable capacity and specific energy density for the overall battery design.
   b) The ease of handling the flexible CNT papers makes them readily shaped into various forms required in a variety of flexible and lightweight electronic devices.
   c) Problems related to metal collectors, their manufacturing, processing, corrosion and adhesion problems with the electrode material are avoided.
   d) The process of synthesizing the CNT/SnO$_2$ nanocomposite is very simple and does not even require the functionalization of carbon nanotubes.
   e) The anode can be used in Li ion battery which can be used to power Solar Lanterns, solar fans etc. which can be used in remote areas as demonstrated.

What is claimed is:

1. A process for the preparation of flexible, free standing, anode material in the form of paper,
   wherein the paper comprises Carbon Nano Tubes (CNT) and metal in the ratio ranging between 99:1 to 50:50 having specific capacity in the range of 136 to 417 mAh/g after 50 cycles by C/10 rate; and
   wherein said process consists of the steps of:
   (i) dispersing the carbon nanotubes in a solvent by using ultrasonication for 3 hours;
   (ii) dissolving inorganic metallic salts in distilled water by ultrasonication;
   (iii) mixing the solution obtained from step (i) and (ii) using magnetic stirrer for 1 hour;
   (iv) refluxing of the solution obtained from step (iii) in air at 100° C. for 4 hours;
   (v) filtering of solution obtained from step (iv) in a vacuum filtration unit to obtain a metal oxide/carbon nanotube nanocomposite;
   (vi) washing of filtrate obtained in step (v) using Deionized water;
   (vii) drying of composite obtained from step (vi) in vacuum oven; and
   (viii) obtaining the flexible, free standing, anode material in the form of paper through paper making technology using vacuum filtration.

2. The process as claimed in step (i) of claim 1, wherein the solvent is selected from the group consisting of derivatives of ethylene glycol and polyols selected from the group consisting of diethylene glycol and polyethylene glycol.

3. The process as claimed in step (i) of claim 1, wherein the carbon nanotubes are selected from the group consisting of multi-walled carbon nanotubes (MWCNT), single-walled carbon nanotubes (SWCNTs), and combinations thereof.

* * * * *